United States Patent [19]

Hasegawa

[11] Patent Number: 4,688,532
[45] Date of Patent: Aug. 25, 1987

[54] INTAKE SYSTEM FOR DIRECT FUEL INJECTION DIESEL ENGINE

[75] Inventor: Shumpei Hasegawa, Niiza, Japan

[73] Assignee: Honda Giken Kogyo Kabushiki Kaisha, Tokyo, Japan

[21] Appl. No.: 738,722

[22] Filed: May 29, 1985

[30] Foreign Application Priority Data

Jun. 29, 1984 [JP] Japan .............................. 59-134833

[51] Int. Cl.$^4$ .......................... F02B 31/00; F02D 9/02
[52] U.S. Cl. ..................................... 123/302; 123/308
[58] Field of Search ............... 123/301, 302, 308, 432

[56] References Cited

U.S. PATENT DOCUMENTS

| | | | |
|---|---|---|---|
| 3,240,190 | 3/1966 | Christian et al. | 123/302 |
| 3,903,849 | 9/1975 | List et al. | 123/308 |
| 3,933,142 | 1/1976 | List et al. | 123/188 M |
| 4,211,189 | 7/1980 | Hamai | 123/308 |
| 4,249,495 | 2/1981 | Trihey | 123/432 |
| 4,270,500 | 6/1981 | Nakagawa et al. | 123/308 |
| 4,354,463 | 10/1982 | Otani et al. | 123/308 |
| 4,418,655 | 12/1983 | Henning | 123/41.82 R |
| 4,480,617 | 11/1984 | Nakano et al. | 123/308 |

FOREIGN PATENT DOCUMENTS

| | | | |
|---|---|---|---|
| 56-132429 | 10/1981 | Japan | 123/432 |
| 57-206723 | 12/1982 | Japan | 123/432 |
| 55-135323 | 8/1983 | Japan | 123/308 |

Primary Examiner—Andrew M. Dolinar
Attorney, Agent, or Firm—Armstrong, Nikaido, Marmelstein & Kubovcik

[57] ABSTRACT

An intake system for a direct fuel injection diesel engine is disclosed which has a cylinder block with a cylinder slidingly receiving a piston. A cylinder head is mounted on the cylinder block, and a fuel injector is adapted to directly inject fuel into a combustion chamber formed between the lower side of the cylinder head and the upper side of the piston, wherein the cylinder head has first and second intake passages which are independent of each other and which are adapted to introduce air into the combustion chamber. The first intake passage is oriented substantially tangentially to the combustion chamber and substantially orthogonally to the axis of the cylinder, and has a helical end portion opening into the combustion chamber to form a swirl of air flowing therethrough. The second intake passage is oriented such that the end portion thereof, adjacent the combustion chamber, is closer to the central axis of the cylinder than the end portion of the first intake passage adjacent the combustion chamber. The second intake passage is provided with an intake controller which prevents air from flowing in the second intake passage at low engine speeds but allows air to flow in the second intake passage at high engine speeds.

1 Claim, 5 Drawing Figures

INTAKE SYSTEM FOR DIRECT FUEL INJECTION DIESEL ENGINE

BACKGROUND OF THE INVENTION

1. Field of the Invention

The present invention relates to an improvement in the intake system of a direct fuel injection diesel engine.

2. Description of the Prior Art

A conventional diesel engine has two intake ports, one of which is a swirl port which imparts a varying force to the swirl of intake air in accordance with the state of operation of the engine thereby reducing fuel consumption and increasing engine output power, while suppressing the generation of smoke. An example of such a diesel engine is shown in Japanese Utility Model Publication No. 32812/1977.

SUMMARY OF THE INVENTION

An object of the invention is to provide an improved intake system for direct fuel injection diesel engines in which a relatively intense swirl is formed in the combustion chamber at low engine speeds, whereas, at high engine speeds, a relatively weak swirl is formed, whereby the charging efficiency is improved to further improve the fuel economy and engine output power, while the generation of smoke is surpressed.

The present invention is directed to an intake system for a direct fuel injection diesel engine having a cylinder block with a cylinder slidingly receiving a piston. A cylinder head is mounted on the cylinder block, and a fuel injector is adapted to directly inject fuel into a combustion chamber formed between the lower side of the cylinder head and the upper side of the piston, wherein the cylinder head has first and second intake passages which are independent of each other and which are adapted to introduce air into the combustion chamber. The first intake passage is oriented substantially tangentially to the combustion chamber and substantially orthogonally to the axis of the cylinder, and has a helical end portion opening into the combustion chamber to form a swirl of air flowing therethrough. The second intake passage is oriented such that the end portion thereof, adjacent the combustion chamber, is closer to the central axis of the cylinder than the end portion of the first intake passage adjacent the combustion chamber. The second intake passage is provided with an intake controller which prevents air from flowing in the second intake passage at low engine speeds but allows air to flow in the second intake passage at high engine speeds.

The intake system of the present invention forms a relatively strong swirl of air in the combustion chamber during low speed operation of the engine, while, during high speed operation of the engine, a comparatively weak swirl is formed in the combustion chamber so that the rate of sucking of the intake air is increased.

BRIEF DESCRIPTION OF THE DRAWINGS

FIGS. 1 to 4 show a first embodiment of the preferred embodiment of the present invention in which:

FIG. 1 is a bottom plan view of a cylinder head;

FIG. 2 is a sectional view taken along the line II—II of FIG. 1;

FIG. 3 is a sectional view taken along the line III—III of FIG. 1;

FIG. 4 is a sectional view taken along the line IV—IV of FIG. 1; and

DETAILED DESCRIPTION OF THE PREFERRED EMBODIMENTS

Figure 1:
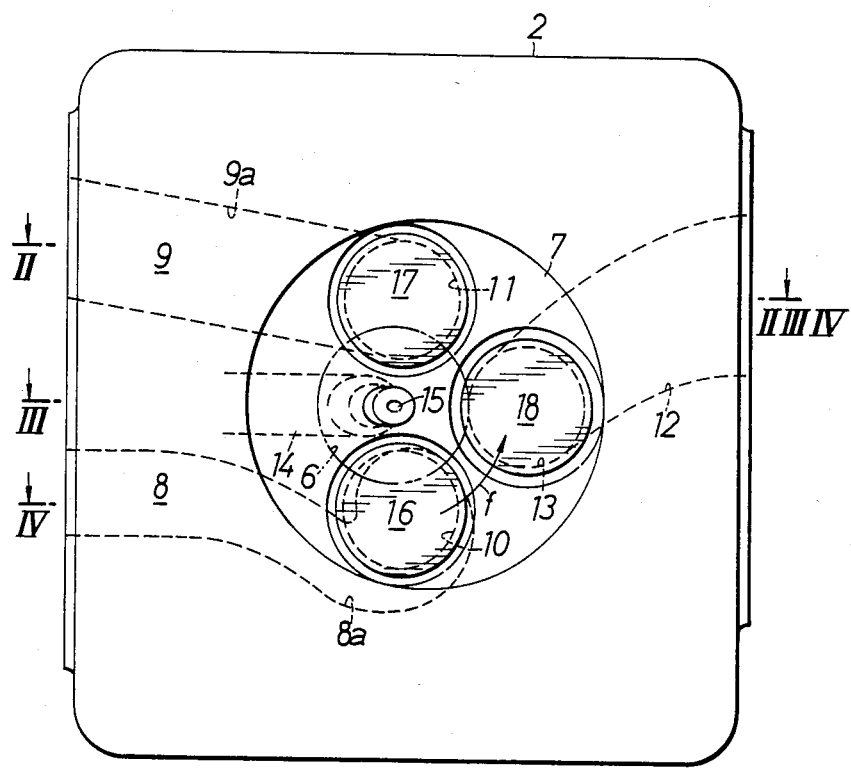

A first embodiment of the invention will be described hereunder with reference to FIGS. 1 to 4.

A diesel engine has an engine body E which comprises a cylinder block 1 and a cylinder head 2 mounted on the cylinder block 1 through a gasket 3. The cylinder 4 of the cylinder block 1 slidably receives a piston 5. The piston 5 has a recess 6 at the center of the top surface thereof. The recess 6 forms a part of a combustion chamber 7 formed between the upper side of the piston 5 and the lower side of the cylinder head 2.

First and second intake passages 8 and 9 are arranged in a side-by-side fashion on one side of the cylinder head 2. These intake passages 8 and 9 have end portions 8a and 9a respectively opening into the combustion chamber 7 to form first and second intake valve ports 10 and 11, while the other end of each of the intake passages opens into one side of the cylinder head 2. The first and second intake valve ports 10 and 11 are adapted to be opened and closed by first and second intake valves 16 and 17.

Figure 2:
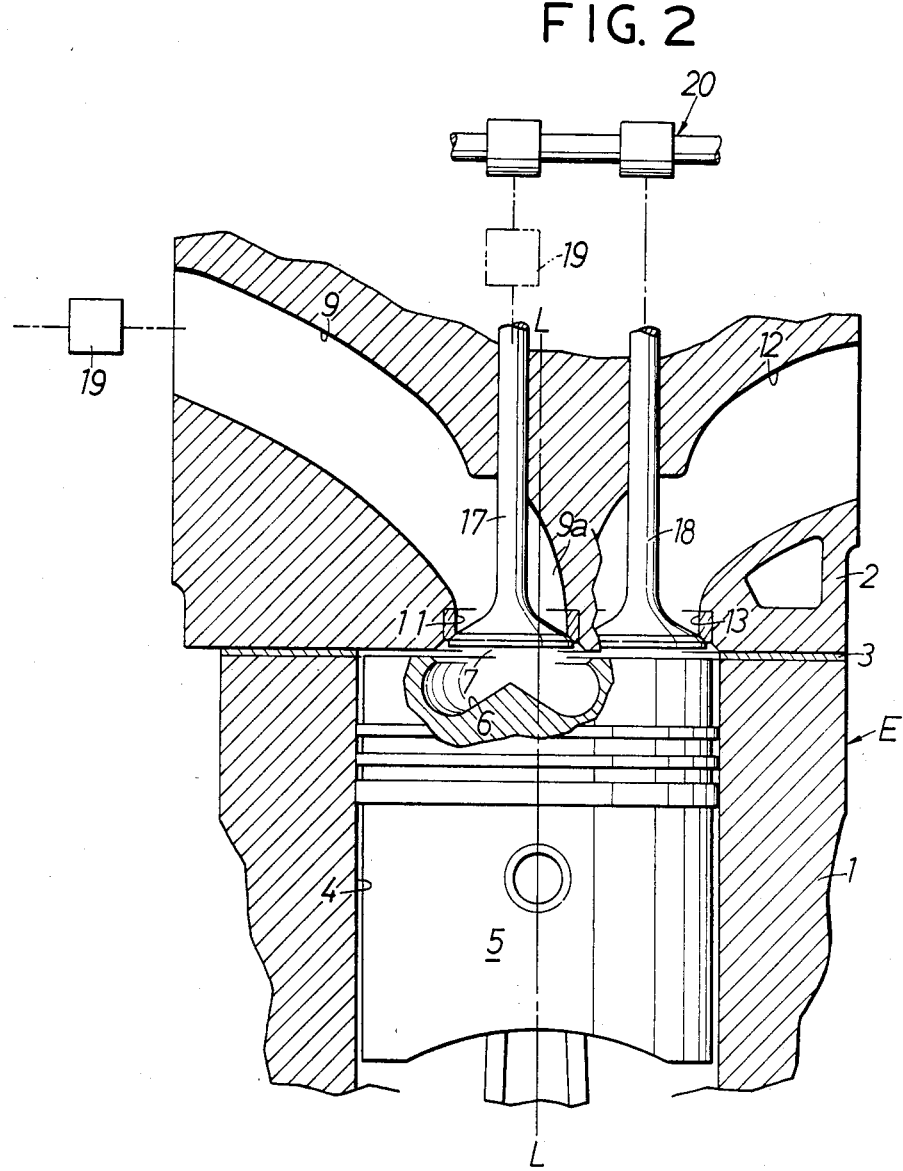
Figure 3:
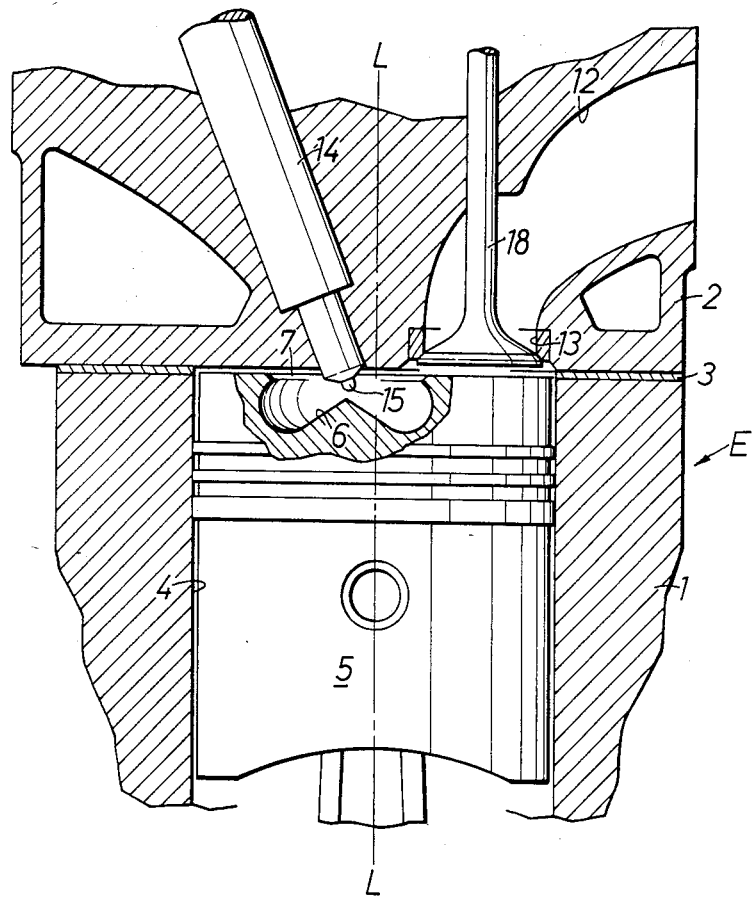
Figure 4:
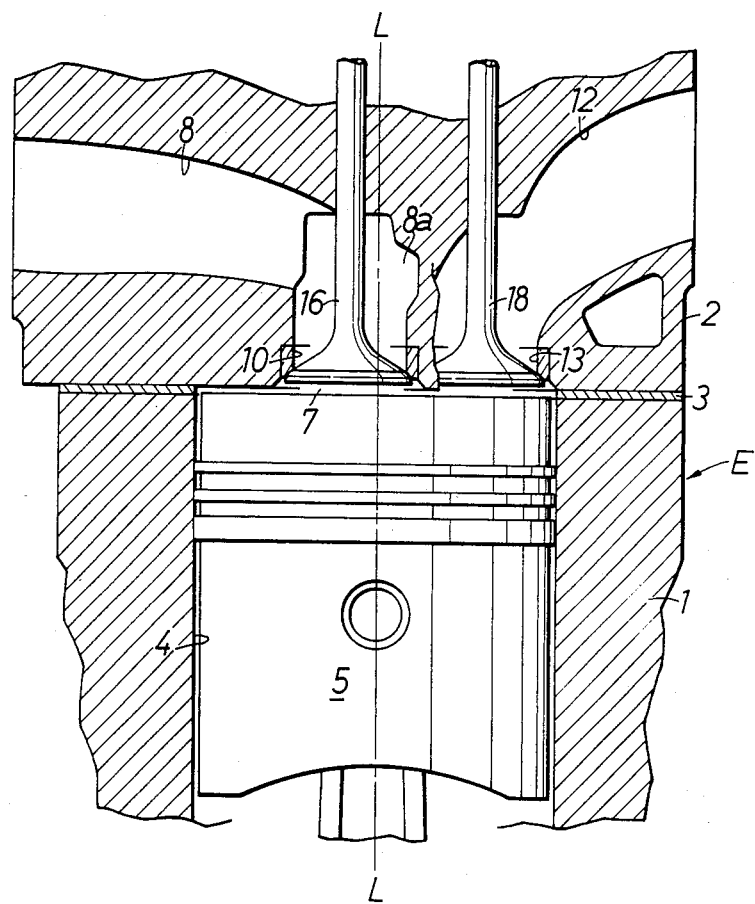

As shown in FIGS. 1, 2 and 4, the first and second intake valve ports 10 and 11 have areas which partially overlap the recess 6 in the piston 5. When the piston 5 is in the region of the top dead center, the first and second intake ports directly communicate with the recess 6.

As shown in FIG. 4, the first intake passage 8 extends substantially horizontally and substantially orthogonally to the axis L—L of the cylinder 4 and is oriented tangentially to the combustion chamber 7. Further, as shown in FIG. 1, the end portion 8a of the first intake passage 8 opens into the combustion chamber 7, i.e., the end portions 8a near the first intake valve port 10, has a helical form. The intake air flowing in the first intake passage 8 generates a strong swirl and flows into the combustion chamber 7 substantially tangentially.

As clearly seen from FIG. 2, the second intake passage 9 has an end portion 9a which is oriented more closely to the axis L—L of the cylinder 4 than the end portion 8a of the first intake passage 8 and has a standard form, e.g., a straight form or an arcuate form. The air flowing in the second intake passage 9 is directed from the upper side towards the lower side of the combustion chamber 7. Therefore, the intake air flowing from the second intake passage 9 into the combustion chamber 7 does not flow in a direction to negate the swirl, although it does weaken the swirl.

An intake controller 19 is connected to the second intake passage 9. The intake controller 19 is a conventional device which is adapted to open and close a stop valve connected to the second intake passage 9. More specifically, the stop valve is closed at low engine speeds and is opened at high engine speeds. As shown by the double-dot-dash line in FIG. 2, the intake controller 19 may be a conventional valve stopper mechanism associated with the valve actuating mechanism 20 for the second intake valve 17. The valve stopper mechanism locks the second intake valve 17 in the closed position at low engine speeds, whereas, at high engine speeds, the valve stopper mechanism becomes inoperative thus allowing the second intake valve 17 to open and close by the operation of the valve actuating mechanism 20.

An exhaust passage 12, formed on the other side of the cylinder head 2, has an inner end forming an exhaust valve port 13 opening into the combustion chamber 7. The outer end of the exhaust passage 12 opens into the other side of the cylinder head 2 and is connected to an exhaust system which is not shown. The exhaust valve port 13 is adapted to be opened and closed by an exhaust valve 18.

The cylinder head 2 is provided with a fuel injector 14 having a nozzle 15 which faces the central region of the recess 6 when the piston 5 is in its top dead center.

The operation of the first embodiment will be explained as follows:

The supply of the intake air to the first and second intake passages 8 and 9 is controlled by the conventional intake controller 19 in accordance with the state of operation of the engine. More specifically, at low engine speeds, including idling, the air supply to the second intake passage 9 is stopped so that the intake air is introduced into the combustion chamber 7 only through the first intake passage 8. At high engine speeds, intake air is introduced into the second intake passage 9 so that the air is brought or introduced into the combustion chamber 7 through both the first and second intake passages 8 and 9.

In the suction stroke at low engine speeds, air is induced at a low rate only through the first intake passage 8. Since the first intake passage 8 extends substantially orthogonally to the axis L—L of the cylinder 4 and substantially tangentially to the combustion chamber 7, and since the end portion 8a of the first intake passage 8 opening into the combustion chamber 7 has a helical form, a strong swirl of intake air is formed while the air flows through the first intake passage 8 into the combustion chamber 7.

At the start of the suction stroke in which the piston 5 is near the top dead center, the swirl flows directly into the recess 6 formed in the top surface of the piston 5, so that a strong swirl of intake air is maintained in the recess 6 from the beginning of the suction stroke till the end of the compression stroke. The swirling air in the combustion chamber 7 is mixed with the fuel which is injected from the nozzle 15 of the fuel injector 14 at the end of the compression stroke, and the mixture is ignited and exploded. Thus, at low engine speeds, air is induced into the combustion chamber 7 only through the first intake passage 8 so that a strong swirl is formed with a little amount of intake air. This in turn ensures a sufficient mixing of air and fuel in the recess 6, thus considerably improving both ignition and combustion efficiency.

As the engine accelerates to high speeds, intake air is introduced into the combustion chamber through both intake passages 8 and 9 without encountering much resistance. Thus, each of the first and second intake passages 8 and 9 permits a large quantity of air to flow therethrough into the combustion chamber 7.

Since the end portion 9a of the second intake passage 9 is oriented close to the axis L—L of the cylinder 4, the intake air in the second passage 9 is directed downward into the combustion chamber 7. Thus, the intake air introduced through the second intake passage 9 does not flow in a direction which resists the swirl of air (see arrow f in FIG. 1) coming from the first intake passage 8, and thus the weakening of the swirl is suppressed somewhat but not stopped. At high engine speeds, the intake air from the second intake passage 9 flows into the combustion chamber 7 in such a manner as not to negate the swirl, so that a high rate of supply of intake air is maintained, thus enhancing both combustion efficiency and charging efficiency.

Figure 5:
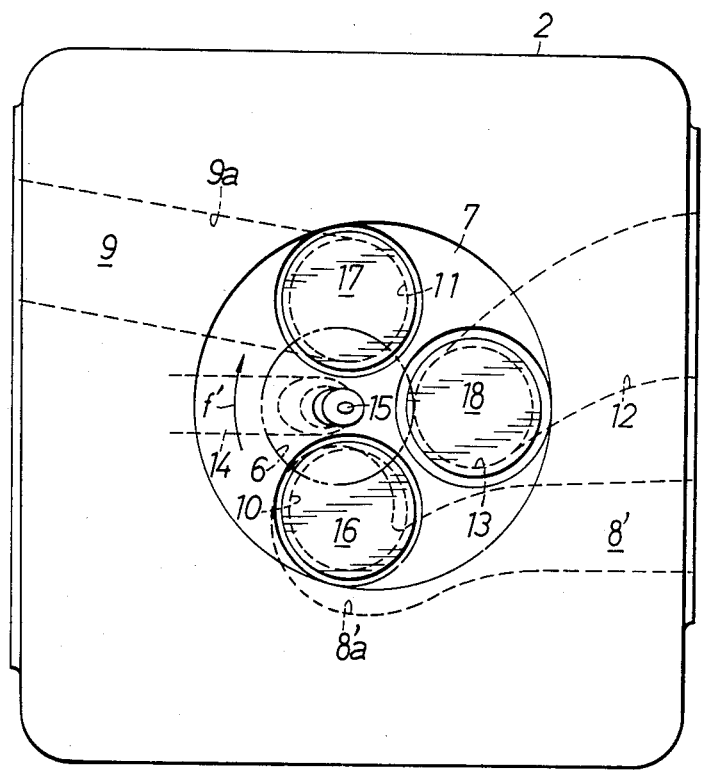
FIG. 5 shows a second embodiment of the present invention and is a bottom plan view of the cylinder head similar to that in FIG. 1.

FIG. 5 shows a second embodiment of the invention. The second embodiment is distinguished from the first embodiment only in that the first intake passage 8' and the exhaust passage 12 are arranged to extend in the same direction in a side-by-side fashion. According to this arrangement, the intake air introduced through the first intake passage 8' and the intake air introduced through the second intake passage 9 flows in the same direction, so that the charging efficiency is further improved at high engine speeds.

As has been described, according to the invention, there is provided an intake system of a direct fuel injection diesel engine, wherein the cylinder head has first and second intake passages which are independent of each other and adapted to introduce air into the combustion chamber. The first intake passage 8 is oriented substantially tangentially to the combustion chamber and substantially orthogonally to the axis of the cylinder and it has a helical end portion opening into the combustion chamber to form a swirl of air flowing therethrough. The end portion 9a of the second intake passage 9 is oriented such that it is closer to the central axis of the cylinder than the end portion 8a of the first intake passage 8, and the second intake passage 9 is provided with an intake controller 19 which prevents the air from flowing into the second intake passage at low engine speeds, but allows the air to flow into the second intake passage at high engine speeds.

Therefore, a strong swirl of intake air is formed in the combustion chamber at low engine speeds, so that the effect of the swirling flow is further enhanced to attain a marked increase in the ignition and combustion efficiency at low engine speeds. At high engine speeds, the intake air is introduced while forming a swirl which is weaker than that formed at low speeds, so that the charging efficiency is improved in this range of engine operation. In consequence, the ignition, combustion and the charging efficiency are improved over a wide range of engine operation including both low speeds and high speeds, thus attaining a marked improvement in the performance of the engine.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein

I claim:

1. An intake system for a direct fuel injection diesel engine having a cylinder block, at least one cylinder in said cylinder block, a piston in said cylinder having a recess on a top surface thereof, a cylinder head mounted on said cylinder block on top of said cylinder, a fuel injector adapted to directly inject fuel into a combustion chamber formed between the lower side of said cylinder head and the recess on the top surface of said piston, and below said injector, and a single exhaust passage opening to said combustion chamber at a location near the injector, said intake system comprising first and second intake passages in said cylinder head, said first and second intake passages being independent of each other and adapted to introduce air into said combustion chamber, and controller means coupled to said second intake passage for controlling the flow of air therethrough, wherein said first intake passage is disposed to extend from one side of the cylinder head and is oriented substantially tangentially to said combustion chamber and substantially orthogonally to a central axis of said cylinder and has a helical end portion opening into said combustion chamber on one side of a plane passing through said fuel injector and said exhaust passage such that a swirl of air is formed and flows therethrough into said combustion chamber, wherein said second intake passage is disposed to extend from an opposite side of the cylinder head to the first intake passage and has an end portion, adjacent jthe combustion chamber, located closer to the central axis of said cylinder than the end portion of said first passage, adjacent the combustion chamber, said end portion of the second intake passage being inclined toward a position parallel to the central axis of the cylinder and opening to the combustion chamber on an opposite side of said plane so as to allow air fed through the second intake passage to be charged into the combustion chamber in a direction which is the same as the direction of flow of the swirling air from the first intake passage, and wherein said controller means prevents the flow of air through said second intake passage at low engine speeds and permits the flow of air through said second intake passage at high engine speeds.

* * * * *